Figure 4:
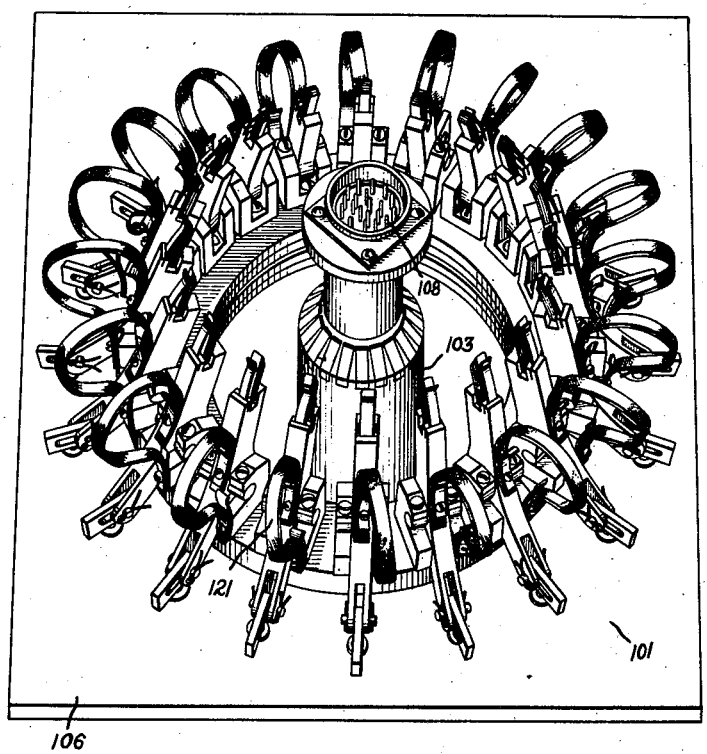

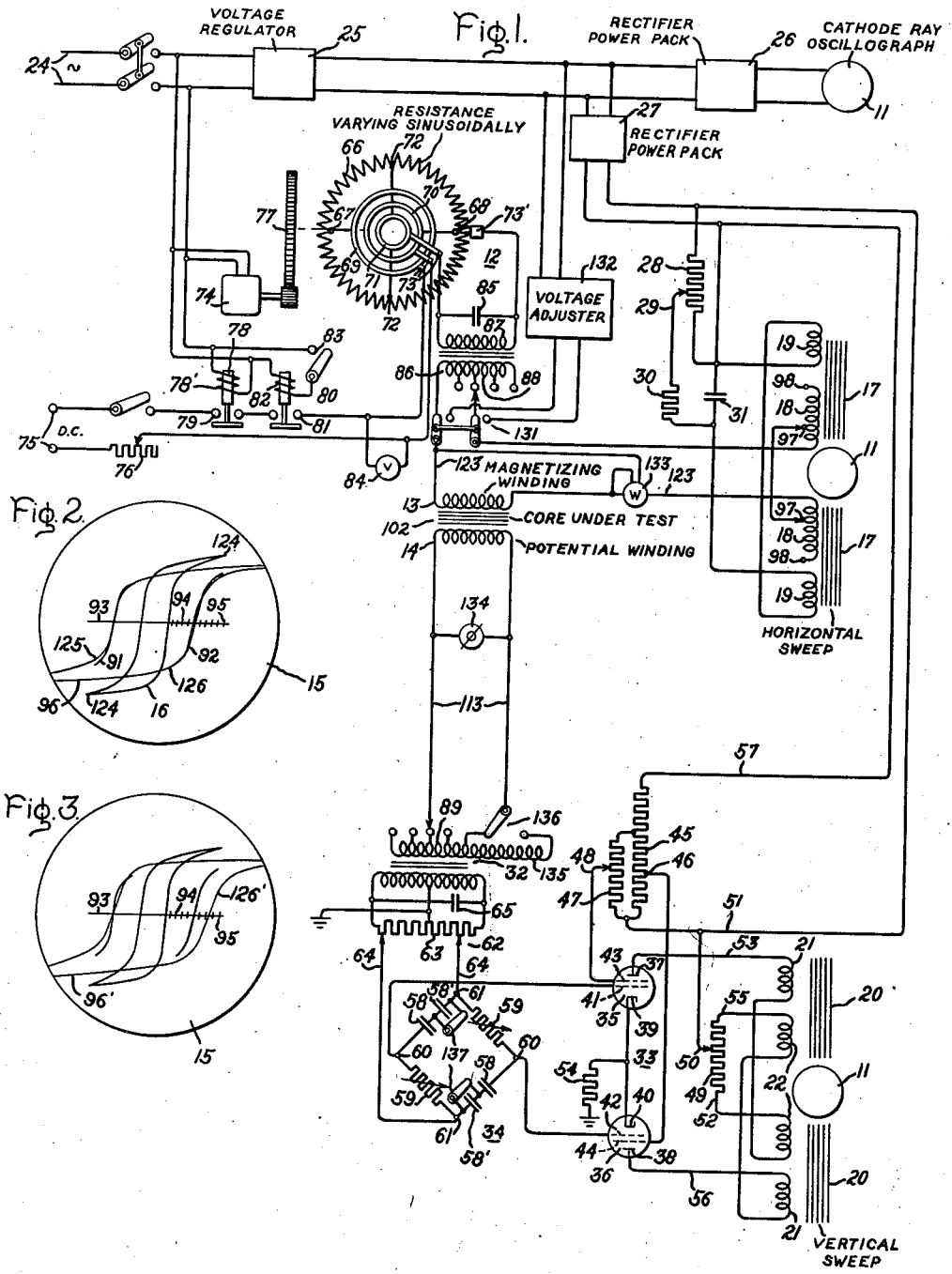

May 19, 1942.  S. C. LEONARD  2,283,742
HYSTERESOSCOPE
Filed March 20, 1940   2 Sheets-Sheet 2

Inventor:
Stephen C. Leonard
by Harry E. Dunham
His Attorney.

Patented May 19, 1942

2,283,742

UNITED STATES PATENT OFFICE 2,283,742

HYSTERESOSCOPE

Stephen C. Leonard, Pittsfield, Mass., assignor to General Electric Company, a corporation of New York Application March 20, 1940, Serial No. 324,984

11 Claims. (Cl. 175—183)

My invention relates to magnetic testing arrangements and concerns particularly such arrangements for testing wound-strip magnetic cores for electromagnetic induction apparatus.

It is an object of my invention to provide improved arrangements for testing and comparing magnetic cores for transformers and the like, and matching cores in apparatus employing a plurality of cores, determining hysteresis loss, peak magnetizing current and general magnetic characteristics on a production line basis.

Other and further objects and advantages will become apparent as the description proceeds.

As explained in Letters Patent 2,160,588—Granfield—granted May 30, 1939—Electromagnetic induction apparatus and method of making the same—highly efficient transformers and other electromagnetic induction apparatus having low iron losses may be produced by utilizing form-wound conductive winding structures and flatwise, spirally-wound magnetic strip material forming compact magnetic cores. As also explained in the Granfield patent certain precautions are to be taken to avoid deleterious strains in the magnetic strip material, and the assembling process is such that adhesions between the turns of strip produced during heat treatment which would cause high eddy current losses are broken up. The Granfield construction permits the use in the magnetic core of sheet steel which is characterized by unusually low losses when tested in the laboratory by suitable methods, such as the Epstein method. In order to obtain the full advantage of the Granfield construction it is important to make sure that the steel used is of the desired quality, having the low loss characteristics which would be obtained in the proper grade of steel. It is impossible, however, to subject individual cores ready for application to a conductive winding structure to the Epstein core-loss test after the construction of the cores without making them no longer available for use in constructing a transformer. It is desirable, therefore, to provide a testing method which may be applied to the coils of magnetic strip which are finished to the extent of being ready for application to conductive winding structures in order to determine not only whether the steel therein is of the proper quality, but whether the strip may have been subjected to deleterious jars or strains subsequent to heat treatment which would destroy the advantageous properties brought out by the heat treatment.

Magnetic tests on the separate coils of strip might be made with a commercial-frequency source of A. C. supply by winding magnetizing coils and potential coils into the magnetic coils by hand, but this procedure would be unduly expensive for production testing and would also fail to take into consideration that the cores in the finished apparatus have their adhesions broken, whereas the adhesions have not yet been broken before the cores have been applied to the form-wound electrical winding structures of the finished apparatus. These adhesions provide electrical eddy current paths and result in excessive eddy current losses, making it impossible by ordinary methods to obtain a comparison between cores with regard to the iron losses under their normal operating conditions.

Another problem encountered in connection with electromagnetic induction apparatus having a plurality of magnetic cores, such as the arrangement of Fig. 12 of the Granfield patent having two magnetic cores 34 and 35, is that the total iron losses depend not merely on the quality of the cores considered independently, but upon the relationship between the general magnetic characteristics of the cores. For example, either of the cores tested independently may indicate relatively good qualities without excessive iron losses, but when assembled in the same electromagnetic induction apparatus may produce relatively high and excessive iron losses. This may come about owing to the fact that one of the cores has a slightly higher reluctance than the other, tending to cause a disproportionate part of the flux to flow through the core having less reluctance, so that it operates at a very much higher flux density than the design of the apparatus calls for, causing its iron losses to be made very much greater, far more than compensating the reduction in iron losses which probably occurs in the core which is not carrying its share of the flux. As is well known, iron losses increase at a relatively rapid rate with flux density, particularly when the flux density is increased beyond the range which is considered the maximum for a good design. Such lack of balance in flux density may take place either in the case of cores which differ slightly in their inherent iron losses when tested in separate winding structures, or in the case of cores which have apparently the same iron losses but have different shapes of hysteresis loops so that in one portion of the alternating current cycle one core has a greater reluctance and in the other portion, the other core has a greater reluctance.

It is accordingly an object of my invention to provide a magnetic core testing and comparing arrangement which may be carried out quickly and easily by inexperienced operators, having little technical knowledge and which serves not only to classify cores as to their quality from the standpoint of iron losses, but also to classify the cores from the standpoint of general magnetic characteristics and shapes of the hysteresis loops for the purpose fo selecting magnetic cores which could efficiently be utilized in the same electromagnetic induction apparatus.

In carrying out my invention in its preferred form I utilize a cathode ray oscillograph arranged for automatically tracing the hysteresis loop of a coil of magnetic strip to be tested. The test is made by subjecting the core to be tested to a magnetizing force by means of a magnetizing winding and detecting the flux by means of a pick-up or potential winding. One sweep circuit of the cathode ray oscillograph is connected in responsive relation to the magnetizing winding so that sweep of the cathode ray beam is produced in the direction of one axis proportional to the magnetizing current which is, in turn, proportional to the magnetizing force. A condenser-type phase shifter is interposed between the potential winding and the other sweep circuit of the oscillograph in order that the beam of the oscillograph will be deflected along the transverse axis proportional to the magnetic flux which is the integral with respect to time of the voltage induced in the potential winding; since induced voltage is proportional to the differential, with respect to time, of the flux linking the winding. In order to eliminate the effect of the adhesions in the coil of strip, the test is made at a frequency so low that the eddy current iron losses are inappreciable in comparison with the hysteresis iron loss, for example, at a frequency of about two cycles per second. I utilize a two-cycle generator of special design in order to obtain a sine wave magnetizing force. In order to permit rapid and accurate testing, a winding jig is provided so arranged that the turns of both the magnetizing winding and the potential winding may be opened quickly and easily for inserting or removing the magnetic cores.

Figure 5:
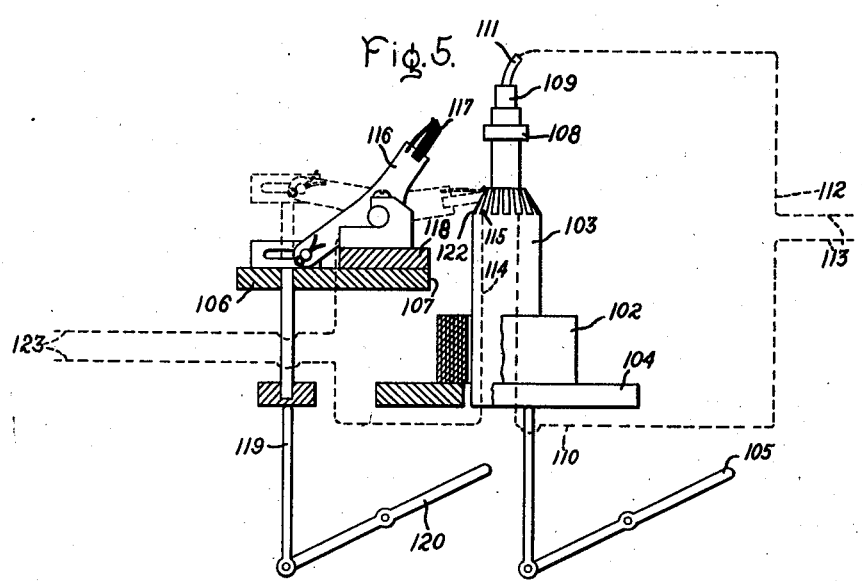

The invention will be understood more readily from the following detailed description when considered in connection with the accompanying drawings and those features of the invention which are believed to be novel and patentable will be pointed out in the claims appended hereto. In the drawings Fig. 1 is an electrical circuit diagram of a core testing machine constructed in accordance with one embodiment of my invention showing some of the parts schematically. Fig. 2 is an end view of the oscillograph representing the slip-on disk and also showing the oscillograph tracing produced under the disk by a tested core having a standard hysteresis loop and standard general magnetic characteristics. Fig. 3 is a view corresponding to Fig. 2, but showing the tracing of the hysteresis loop of a core having greater than the standard loss. Fig. 4 is a perspective view of the winding jig seen from the top, showing the removable connections for opening up the turns of the magnetizing and potential windings, and Fig. 5 is a fragmentary elevation, partially in section and partially schematic of the apparatus of Fig. 4, showing also a core in place to be tested. Like reference numerals are utilized throughout the drawings to designate like parts.

Referring more in detail to Fig. 1, the apparatus there illustrated comprises a cathode ray oscillograph 11 which is indicated schematically by a circle representing the end view or screen of the cathode ray oscillograph tube, a two-cycle generator 12 for magnetizing a core under test, and a winding jig including an exciting magnetizing winding 13 and a pick-up or potential winding 14. For comparing the tested core with the characteristics of a core selected as standard, there is a slip-on disk 15 (Fig. 2) composed of transparent or translucent material having a standard hysteresis loop 16 marked thereon.

In order to permit having relatively low impedance in the magnetizing winding and potential winding circuits, I preferably employ a cathode ray oscillograph of the type having magnetic-deflection coils rather than electrostatic-deflection plates. The horizontal sweep circuit is represented by the cores 17 with the deflecting sweep coils 18 and the zero setting sweep coils 19. The vertical sweep circuit is represented by similar cores 20 with the deflecting and balancing sweep coils 21 and 22. It will be understood that the sweep circuits are represented only schematically and that in the actual well known oscillograph construction the sweep-coil cores 17 and 20 are at right angles to one another, and placed radially around the portion of the cathode ray oscillograph 11 through which the electron beam is passed, at which position the beam is readily deflected by magnetic fields. The cathode ray tube 11 is indicated at three different places on the drawings in order to simplify the drawings, although in the actual device all of the sweep coils radiate from the same portion of the same oscillograph tube, in accordance with the customary arrangement of such tubes.

To provide the requisite power for energizing the oscillograph 11 there is a source of alternating current 24 to which is connected an alternating-current voltage regulator 25, which may be of the saturated core type, for example, which is known in the art and serves to provide alternating voltage of constant R. M. S. value. The actual power supply for the cathode ray oscillograph 11, however, is direct current and is provided by a rectifier and power pack 26 interposed between the output side of the voltage regulator 25 and the various electrodes of the cathode ray oscillograph 11, which connections are not shown in detail since a standard type of cathode ray oscillograph and power pack are employed. Likewise, for energizing the horizontal and vertical sweep circuits I utilize a rectifier and amplifier power pack 27 which has its input connected to the output side of the voltage regulator 25.

For energizing the zero-setting horizontal sweep coils 19, there is a potentiometer 28 consisting of a resistor connected across the output side of the power pack 27 and an adjustable tap 29 for connecting the coils 19 in series across a portion of the potentiometer 28. A resistor 30 is also interposed in series with the coils 19, and for smoothing out any possible voltage variations, a condenser 31 may be connected across the coils 19. The deflection-producing sweep coils 18 are connected in series with the magnetizing winding 13.

A potential transformer 32 and an electron tube amplifier 33 are interposed between the potential winding 14 and the vertical deflection-producing sweep coils 21. For obtaining the requisite phase shift or time integration of the voltage induced in the potential coil 14, a phase shifter 34 is provided. The amplifier 33 comprises a pair of four-element electronic discharge devices or tetrodes 35 and 36 which are preferably of the vacuum tube type and may be what are known as beam-power amplifiers. They comprise anodes 37 and 38, cathodes 39 and 40, heated by filaments not shown since the tubes are of standard construction, control electrodes or grids 41 and 42 and auxiliary control electrodes or screens 43 and 44. The requisite potential for the screens 43 and 44 is provided by the tapped resistor 45 connected across the power pack 27. One of the screens 44 is connected to a fixed tap 46 on the resistor 45, and for the sake of balancing the tubes a potentiometer 47 connected across a portion of the resistor 45 is provided having an adjustable tap 48 to which the screen 43 of the other tube is connected. The requisite potential for the anodes 37 and 38 is obtained from the D.-C. plate balancing potentiometer 50 through the interwound deflection coil sections 21 and 22. Each vertical-sweep deflection coil is divided in two sections. A coil section connected in the plate circuit of one of the tetrodes is interwound with the comparable section in the plate circuit of the other tetrode and in conjunction with a laminated iron pole piece form one-half of the vertical-sweep deflection system. The vertical-sweep deflection coil sections are so interconnected that the D.-C. component vectors of the plate excitation are in opposition while the A.-C. component vectors are in phase. The vertical beam is normally centered by adjusting the potentiometer 50 to give complete nullification of the D.-C. component of plate excitation. The anode circuit of the tube 35 may be traced from the tap 50 of the centering resistor 49, the end 52 of the resistor 49, one of the deflecting sweep coils 22, the upper deflecting sweep coil 21, the conductor 53, the anode 37, the interelectrode space of the tube 35, the cathode 39, and a resistor 54 to ground; and similarly the anode circuit for the tube 36 may be traced from the centering resistor tap 50, the end 55 of the resistor 49, the upper centering sweep coil 22, the lower deflecting sweep coil 21, the conductor 56, the anode 38, the interelectrode space of the tube 36, the cathode 40 and the resistor 54 to ground, it being understood that either the negative lead 57 on the power pack 27 or some intermediate point between the leads 51 and 57 is also grounded.

The phase shifter 34 consists of a pair of condensers 58 and a pair of adjustable resistors or rheostats 59 connected to form a well known type of quadrature bridge with output terminals 60 connected to the control electrodes 41 and 42, and input terminals 61 connected to the output winding of the potential transformer 32. Since sine wave voltage is applied to the magnetizing winding 13 the flux produced therein also is of sine wave form, and the voltage induced in the winding 14 is of sine wave form. The phase shifter 34 serves also as a time integrator since the time integral of a sine wave is a cosine wave or a sine wave displaced 90° in phase.

For controlling the amplitude of the vertical sweep circuit a potentiometer 62 may be interposed between the output winding of the potential transformer 32 and the input terminals 61 of the phase shifter 34. The potentiometer 62 comprises a resistor 63 grounded at the center, and a pair of adjustable taps 64 each connected to one of the input terminals 61 of the phase shifter 64. For additional smoothing out of the residual commutation ripple a condenser 65 may be connected across the output winding of the transformer 32.

The two-cycle sine generator 12 comprises what may be called a sine wave converter including a sinusoidally distributed endless or closed-circuit resistor 66, a pair of opposite taps 67 and 68, and a pair of slip rings 69 and 70, connected to the taps 67 and 68, respectively, a slip ring 71 connected to neutral or mid points 72 of the resistor 66, suitable brushes 73 cooperating with the slip rings 69, 70 and 71, an additional brush 73' adapted to make contact with points along the resistor 66, a source of direct current 75 connected to the brushes cooperating with the slip rings 69 and 70, and a constant speed motor 74 for rotating the slip rings 69, 70, 71 and the resistor 66. The motor 74 may be a synchronous motor energized by the alternating current source 24 and may have suitable reduction gearing 77 interposed between it and the rotatable structure carrying the resistor 66 in order to reduce the speed of rotation thereof sufficiently to produce a two-cycle-per-second output.

For adjusting the input voltage to the magnetizing winding 13, and the flux density of a tested core, a rheostat 76 may be connected in series with the current source 75. For preventing energization of the direct current circuit when the alternating current source 24 is not connected, a relay 78 may be provided, with a winding 78' connected across the input side of the alternating-current voltage regulator 25 and with contacts 79, in series with the direct current source 75. For preventing energization of the direct current circuit until the operator is ready to make a test, a second relay 80 may be provided having relatively movable contacts 81 connected in series with the current source 75, and an energizing winding 82, having an automatic switch 83 electrically connected in series with the winding 82 and the alternating current source and mechanically connected to a lever in the winding jig to be described hereinafter, which closes the switch 83 only when the proper connections in the exciting winding are made and the core is in place. To maintain the constancy of the applied voltage at which the cores are tested, a voltmeter 84 connected across the circuit of the direct-current source may be provided.

For the sake of simplicity, the resistor 66 is shown as a rotatable continuous toroidally-wound wire resistor on which the brush 73' is adapted to rub as the resistor 66 is rotated. It will be understood, however, that ordinarily it would be more practical to make the resistor 66 of the tapped type having leads from relatively frequent points brought out to segments of a rotatable commutator, cooperating with the stationary brush 73'. The resistances of the successive portions of the resistor 66 are so graduated as to vary sinusoidally with rotation of the resistor 66, with relatively large variations in resistance corresponding to the uniform angular increments in the vicinity of the neutral points 72, and relatively small variations in resistance corresponding to the same angular increments in the vicinity of the taps 67 and 68; a complete sine wave thus being produced by the complete rotation of the resistor 66. To smooth out brush or commutation ripple a condenser 85 may be connected between the brush 73' and the brush cooperating with the slip ring 71.

In order to make the apparatus suitable for testing various sizes of cores without changing the adjustments of the sweep circuits or the direct current input circuit, an impedance matching transformer 86 may be provided having a primary winding 87 connected across the smoothing condenser 85 and a tapped secondary winding 88 connected in series with the test-core magnetizing winding 13 and the horizontal deflection sweep coils 18. Similarly, the potential transformer 32 has its primary winding 89 provided with taps corresponding to those of the impedance matching transformer 86.

One or more slip-on disks, such as the disk 15, shown in Figs. 2 and 3 are provided to facilitate making quick comparisons of cores tested. Each disk 15 is composed of transparent or translucent material slightly dished to fit the outside surface of the fluorescent screen end of the cathode ray oscillograph tube 11 and suitable means, not shown, are provided for keeping the disk 15 in place. In addition to the standard hysteresis loop 16 marked upon the slip-on disk 15, there is a pair of lines 91 and 92 corresponding to segments of a hysteresis loop, identical with the loop 16, but three times its horizontal scale. The disk 15 has also marked thereon a horizontal line 93 representing a horizontal axis of the hysteresis loop and a plurality of division lines 94 and 95 to the right and left, respectively, of the intersection of the loop segment 92 with the horizontal axis 93. The division lines 94 and 95 marked low and high, respectively, are placed at such points along the horizontal axis 93 as to represent variations in area of the large scale hysteresis loop and corresponding gradations of iron loss above and below standard, such as 5% gradations. Since the slip-on disk 15 is transparent or translucent the actual hysteresis loop 96 produced by the cathode ray oscillograph 11 is also visible in Fig. 2. The loop 96 is that produced with the apparatus set for the large scale loop.

In order to change the scale of the hysteresis loop for enabling the operator to observe both the general shape of the loop and make a relatively accurate determination of the area, the horizontal deflection-producing sweep coils 18 are provided with taps. One pair of taps 97 is used for producing a small scale loop which remains small enough in size so that the entire loop is visible on the screen from behind the slip-on disk 15. Another pair of taps 98 is used to produce a loop to a much larger scale, e. g., triple scale horizontally. The ends of the triple-scale loop 96 may run off the edges of the disk but it is broad enough at its intersection with the horizontal axis 93 so that the width and accordingly the area may be compared quite accurately with the standard. In the case illustrated, the taps 98 represent three times as many turns of the coils 18 as the taps 97.

To permit placing annular cores to be tested in the machine quickly and removing them quickly, a winding jig 101 is provided, such as illustrated in Figs. 4 and 5. For receiving the cores to be tested, particularly hollow, cylindrical wound-strip magnetic cores, such as those illustrated in the aforesaid Granfield patent, there is a vertical post 103 in the winding jig having an external diameter small enough to leave a loose fit inside the smallest core to be tested. The post 103 is composed of insulating material but has a plurality of conductors imbedded therein extending longitudinally, as will be explained more in detail hereinafter. For supporting a core 102 to be tested and lowering it into the testing position, an elevator is provided including a vertically movable platform 104 and a foot lever 105 suitably linked to the platform 104. The platform 104 is shown in the lowermost position in Fig. 5 and is movable to a point with its upper surface approximately flush with the lower surface of the plate 106 forming a table top. The table top 106 has a circular opening 107 of sufficient diameter to receive the largest cores to be tested, and the opening 107 is concentric with the post 103.

At the upper end of the post 103 extending vertically beyond the main portion of the post 103, there is a pin connector 108 (Fig. 4) and cooperating therewith there is a socket connector 109, the number of sockets or connecting elements in the socket connector 109 corresponding to the number of pins in the pin connector 108. For each of the pins in the pin connector 108 there is a conductor extending longitudinally through the post 103; only one of these conductors 110 being represented. Each of the conductors is connected to a different one of the pins 108. There is a flexible cable 111 containing conductors forming continuations of the conductors in the post 103 with their ends connected to the connecting elements or sockets in the socket connector 109, only one of said flexible conductors 112 in the cable 111 being represented in Figure 5. The arrangement is such that when the socket connector and the pin connector 109 and 108 are brought together to form the connection, each of the flexible conductors, such as the conductor 112 in the cable 111 is connected at one end to one of the conductors in the post 103 but is connected at the other end to a different one, so that a plurality of conductive turns is formed around the core 102 to serve as a potential winding. One of the conductors, for example, the flexible conductor 112 is opened and connected in series with leads 113 which are connected to the potential transformer 89, which in turn, is operatively connected to the vertical sweep coils 21. (Fig. 1.) In the arrangement illustrated there are twenty pins and twenty sockets in the pin connector and socket connector 108 and 109 and thus a twenty-turn potential winding is formed, the turns of which may be readily broken to admit the core 102, by simply pulling the connectors 108 and 109 apart.

In a similar manner there is a plurality of longitudinal conductors in the post 103 serving to form a part of the turns of the magnetizing winding, only one of these conductors 114 being represented. Each of the conductors, such as the conductor 114, has connected to it at its upper end a contact segment, such as the segment 115. For each of the contact segments 115 there is a hinged arm 116 carrying a contact finger 117 adapted to make contact with a contact segment 115, and the hinged arms 116 are radially disposed around the post 103, being mounted on a ring 118 surrounding the opening 107 in the table 106. A suitable linkage 119 and operating lever 120 are provided for simultaneously pivoting the hinged levers 116 to raise or lower all of the contact fingers 117, the upper position being shown in full lines and the lower position in dotted lines. The arrangement is such that in the upper position a clear opening is made for placing the core 102 over the post 103, the connectors 108 and 109 being then separated. Continuations of the conductors 114 are electrically connected by means of pigtails 121 (Fig. 4) to the contact fingers 117, the connections being such that each contact segment 115 is connected to a longitudinal conductor which is connected to another one of the contact fingers 117 in position to make contact with the adjacent contact segment, for example, the segment 122. In this manner a magnetizing winding is formed having as many turns as there are contact fingers and contact segments, one of the continuations of the conductors 114, however, being opened to connect the source of energizing current through leads 123 (Fig. 1). The operating handle of the switch 83 (Fig. 1) is so connected to the lever 120 that the switch 83 closes simultaneously with the lowering of the fingers 117.

The conductors 114 and the associated electrical conducting elements are so constructed as to give relatively low resistance, as low impedance of the magnetizing winding is essential to maintain a sine wave form of the magnetizing current. In the arrangement illustrated I am able to keep the resistance of the twenty-finger contacts below $25/1000$ of an ohm and to keep the entire impedance of the horizontal deflection circuit below $9/100$ of an ohm. In the arrangement illustrated I provide twenty finger contacts to give a twenty-turn magnetizing winding. It will be understood that my invention is not limited to utilizing the precise number of turns in either the magnetizing winding or the potential winding. Different types of winding jigs would of course be employed in testing other forms of magnetic samples, such as cores of dynamo machines, bar magnets, etc.

Before the apparatus is used for routine production testing by an unskilled operator unfamiliar with the principles involved, the apparatus may be calibrated by selecting a core as a standard which has been found either by means of laboratory tests or tests in a completed transformer to give satisfactory losses. With such a core in the test machine and with the horizontal sweep circuits in the tap position 97, an actual small scale hysteresis loop is made, such as the loop 16. The slip-on disk 15 is placed over the cathode ray oscillograph screen and the hysteresis loop 16 is traced with some suitable marking material, such as red or black paint, on the transparent or translucent disk 15. The connection of the horizontal sweep coils is then changed to the high sensitivity taps 98 and segments 91 and 92 of the same loop to triple scale are traced on the disk 15. In this preliminary calibration the maximum voltage of the two-cycle sine wave applied to the impedance transformer 86 is so adjusted and determined by means of the rheostat 76 and the voltmeter 84 as to give the desired flux density at which the core is to be operated.

Thereafter, in routine production testing by an unskilled operator the applied magnetizing force is kept at the desired value by keeping a fixed voltage on the voltmeter 84 by means of the rheostat 76.

The operator depresses the foot lever 105 to elevate the platform 104 in order that he may lay the core 102 on the platform and then allows the core 102 to descend in place by releasing the lever 105. The operator then closes the turns of the potential winding by bringing the connectors 108 and 109 together and simultaneously closes the turns of the exciting winding by depressing the lever 120 which brings the fingers 117 in contact with the segments 115. The operation of the lever 120 simultaneously closes the switch 83 causing the direct current to be applied to the generator 12, which in turn causes the two-cycle alternating current sine wave to be applied to the magnetizing winding and the operator adjusts the rheostat 76 to give the voltage on the voltmeter 84 which was found during calibration to be the proper value. With the horizontal sweep coils in the small scale connection produced by taps 97 the operator observes the hysteresis loop produced in the cathode ray oscillograph 11. If necessary the operator centers the loop horizontally by means of the potentiometer tap 29 or vertically by means of the potentiometer tap 50. If the luminous trace on the oscillograph screen representing the hysteresis loop falls completely under the hysteresis loop 16 marked on the slip-on disk 15, the operator knows that the general magnetic characteristics of the core being tested are the same as those of the standard. If the luminous trace differs in shape from the hysteresis loop 16, the core is not of standard characteristics and it is laid aside. It will be apparent that the hysteresis loop may be of substantially the same shape but that the core may deviate somewhat in either losses or peak magnetizing current. If there is a deviation in the peak magnetizing current the operator observes this by reason of the fact that the actual luminous trace representing the hysteresis loop of the core being tested either extends horizontally to the right and left beyond the point 124 of the hysteresis loop 16 if the peak magnetizing current is excessive, or the luminous trace does not extend as far as this point if the peak magnetizing current is low. The operator can detect the losses in the core by comparing the area of the actual luminous loop and the calibration loop 16 marked on the disk 15.

However, in order to obtain greater sensitivity, the operator now changes the connection of the horizontal sweep circuit from the taps 97 to the taps 98 giving a triple scale hysteresis loop. The ends of the loop now will probably go beyond the edges of the disk 15 but the operator is no longer concerned with peak magnetizing current. Within the necessary limit of accuracy, the area of the hysteresis loop is substantially proportional to its width measured along the horizontal base line 93. The operator now has visible a luminous trace 96 representing the triple scale hysteresis loop of the core to be tested. If necessary he brings the point of intersection of the base line 93 and the left-hand side 125 of the loop 96 in registry with the intersection of the standard scale 91 by adjustment of the tap 29. If the right-hand side 126 of the actually visible trace 96 intersects the base line 93 at the same point as the standard segment 92 the operator knows that the losses of the core tested correspond to those of the standard.

On the other hand, if the intersection of the right-hand side 126 of the actual trace comes to the right or to the left of the point of intersection of the standard segment 92 and the base line, the operator observes that the core tested is not standard with regard to its losses. For example, the triple scale loop 96' may be visible to the operator as shown in Fig. 3. By means of the calibrations 95 the operator finds from the point of intersection of the line 126' with the base line 93 that the core is 12½% high in losses, e. g. A suitable chalk mark is made on the core. The transformer cores are classified according to losses. Those with excessive losses are rejected, whereas those having sufficiently low losses are still kept in separate classes so that in the assembly of completed transformers, cores of substantially the same loss characteristics are utilized together in order to avoid unbalance in the flux carried by the cores.

It will be understood that different cores may produce hysteresis loops having different shapes, although the actual magnitude of core losses is substantially the same since the core losses are represented by the area instead of the shape of the hysteresis loop. It may therefore be desirable to make up a number of slip-on disks, such as the disk 15, with various different standard cores producing hysteresis loops of different shapes but with sufficiently low areas. If such additional disks are available the operator may retest the cores which have been laid aside on account of producing hysteresis loops not conforming in shape to the hysteresis loops 16 marked on the disk 15. By successive tests the operator may segregate the cores which correspond in shape of the hysteresis loop and may also classify those of each shape loop according to area of the loop. Those producing similarly shaped hysteresis loops of approximately the same area may be used in transformers to prevent flux unbalance which would lead to excessive losses.

Although I have described my apparatus with regard to its use in testing and comparing wound strip magnetic cores, it will be understood that my invention is not limited to the testing of such cores and obviously does not exclude the testing of magnetic samples of any other kind and for any other purpose, such as motor and generator cores, bar magnets, and the like, suitable modified forms of winding jigs being employed.

My apparatus is of value also for obtaining separation tests at a glance on samples of steel or other ferromagnetic material. By subjecting the same sample first to the magnetizing force of relatively low frequency, as previously described, and then to a magnetizing force of normal commercial frequency or vice-versa, the relative value of the eddy current loss and the hysteresis loss in the sample when operated at commercial frequency may readily be determined by comparing the area of the hysteresis loop at the commercial frequency with the area of the hysteresis loop at the low frequency. At the higher frequency the thickness of the hysteresis loop will be greater, and the difference in thickness represents the eddy current loss.

For example, if desired, a double-throw switch 131 may be provided for disconnecting the magnetizing winding 13 from the low frequency transformer 86 and connecting it to the regulated-voltage commercial-frequency alternating-current source 25, preferably through a suitable device, such as an adjustable ratio transformer 132 for adjusting the commercial-frequency voltage supplied to the magnetizing winding 13. A watt-meter 133 may also be provided, if desired, for measuring the total core loss, and a flux voltmeter 134 connected to the potential winding 14 is provided for maintaining the same flux density in the core at the low frequency and at the commercial frequency. It will be understood that the flux voltmeter is simply a device to measure the average value of either the positive or negative loops of the alternating induced voltage and to maintain the same average or peak value of flux the voltmeter readings must bear the same ratio as the two frequencies. Assuming a 2-cycle low-frequency test and a 60-cycle commercial frequency the reading of the instrument 134 must be 30 times as great at the commercial frequency as at the low frequency. In order that the hysteresis loops at the two frequencies will have comparable abscissae the potential transformer 32 is provided with an extra section 135 cut in by a switch 136 to change the transformer ratio in proportion to the change in frequency. For adapting the phase shifter 34, to the higher frequency series condenser 58' are provided in the condenser arms of the phase-shifter bridge and switches 137 are provided for shunting out the series condensers during the low frequency test. Taps on the resistor arms 59 may now be desirable.

In making the separation test the apparatus is adjusted to subject the sample to the desired flux density and the hysteresis loop is traced. The frequency change-over switches 131, 136 and 137 are then shifted and the second hysteresis loop is compared in area with the first, care being taken to make any necessary adjustment of input voltage to maintain the same flux density in the core. If desired a slip-on disk such as the disk 15 with loop-thickness graduations 94—95 may be employed to facilitate comparing the loop areas by observance of their thicknesses as mentioned in connection with wound-core tests. If a calibrated disk is employed giving a 100% reading at commercial frequency the reduction in thickness of the loop at two cycles will represent the per cent eddy current loss.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A magnetic core tester comprising a cathode ray oscillograph having a screen and horizontal and vertical sweep circuits, a two-cycle magnetizing generator, a winding jig having a cavity for the reception of a core to be tested, and magnetizing and potential windings adapted to be broken and reconnected readily, a phase shifter and a slip-on disk for the oscillograph screen having a standard hysteresis loop marked thereon, said two-cycle generator being operatively connected to the magnetizing winding and one of the sweep circuits of the oscillograph being connected in responsive relation to the magnetizing winding circuit, the phase shifter being interposed between the potential winding and the remaining sweep circuit of the oscillograph, and the slip-on disk being arranged to fit over the screen of the oscillograph.

2. A method of testing wound-strip magnetic cores having adhesions between adjacent turns, which comprises applying an alternating magnetizing force to the core of sufficiently low frequency to make the eddy current loss accentuated by the adhesions relatively unimportant in comparison with the hysteresis loss, obtaining responses proportional to the magnetizing force and the flux produced in the core respectively, producing from said responses a hysteresis loop of such core when so magnetized, and comparing the hysteresis loop so produced with a hysteresis loop produced with a standard wound-strip magnetic core.

3. A method of comparing iron losses of completed flatwise wound-strip magnetic cores before said cores have been assembled with their electrical windings and before the adhesions have been removed, which method comprises the steps of applying alternating magnetizing force to the core of sufficiently low frequency to make the eddy current loss accentuated by the adhesions relatively low in comparison with the hysteresis loss, causing a hysteresis loop to be produced, the coordinates respectively proportional to magnetic flux in the core and magnetizing force, and comparing the thicknesses of the hysteresis loops measured along the axis of magnetizing force produced by the cores to be compared when a predetermined, uniform, peak magnetizing force is applied to the said cores.

4. A winding jig for a magnetic core testing machine comprising a post over which magnetic cores may be placed, an elevator having a platform for supporting the cores, said platform being movably mounted surrounding the said post, a plurality of contact fingers radially surrounding the post, said post having a plurality of contact segments corresponding in number to the number of contact fingers, and having a first set of insulated conductors extending through the post, corresponding in number to the number of contact segments, having a second set of insulated conductors extending through the post, a connector having two parts with cooperating contact elements, one of said parts being mounted on said post, the number of contact elements in each part corresponding to the number of conductors in said second set, flexible connections from the free ends of the first set of conductors to the contact fingers, flexible connections from the free ends of the second set of conductors in the post to the contact elements in the movable part of the connector, and pairs of terminals interposed in each set of connections for making connection to indicators of magnetizing current and induced potential respectively, said contact fingers being movably mounted to permit opening the space surrounding the post for the admission of a core to be tested, and each being adapted to make contact with one of the contact segments of the post, the respective flexible connections being so made that two electrical windings are formed linking the core surrounding the post when the parts of the connector are brought together and the movable fingers are brought in contact with the contact segments on the post.

5. A magnetic core tester comprising an oscillograph having a screen and horizontal and vertical sweep circuits, a low frequency magnetizing generator, a winding jig adapted for the reception of a core to be tested and having magnetizing and potential windings adapted to have their turns broken and reconnected readily, means for integrating with respect to time the voltage appearing in the potential windings and means for indicating a standard hysteresis loop on the oscillograph screen, said magnetizing generator being operatively connected to the magnetizing winding, and one of the sweep circuits of the oscillograph being connected in responsive circuit relationship to the magnetizing winding, the integrating means being interposed between the potential winding and the remaining sweep circuit of the oscillograph.

6. In a magnetic core tester having means for subjecting a core to a predetermined flux density and circuits for causing the hysteresis loop of the core to be traced, the combination of an oscillograph screen on which the actual hysteresis loop is traced, means for superimposing a standard hysteresis loop thereon, and graduations for indicating the deviation in thickness of the hysteresis loop actually obtained from the thickness of the standard hysteresis loop.

7. A winding jig for a magnetic core testing machine comprising a post over which magnetic cores may be placed, a plurality of contact fingers radially surrounding the post said post having a plurality of contact segments corresponding in number to the number of contact fingers, and having a first set of insulated conductors extending through the post, corresponding in number to the number of contact segments, having a second set of insulated conductors extending through the post, a connector having two parts with cooperating contact elements, the number of contact elements in each part corresponding to the number of conductors in said second set, flexible connections from the free ends of the first set of conductors to the contact fingers, connections from each of the conductors to the second set of conductors, the separate contact elements in one part of the connector, flexible connections from the remaining ends of the second set of conductors in the post to the two separate contact elements in the remaining part of the connector, and pairs of terminals interposed in each set for making connection to the source of magnetizing current and the indicator of induced potential respectively, said contact fingers being movably mounted to permit opening the space surrounding the post for the admission of a core to be tested, and each being adapted to make contact with one of the contact segments of the post, the respective electrical connections being so made that two electrical windings are formed linking the core surrounding the post when the parts of the connector are brought together and the movable fingers are brought in contact with the contact segments on the post.

8. A magnetic testing device comprising means for subjecting a magnetic sample to an alternating magnetomotive force, means for producing the magnetic hysteresis loop of the sample, means for changing the frequency of the applied magnetomotive force between a relatively low value, at which eddy current loss is negligible, and the commercial frequency at which electrical apparatus employing material of the sample is to be operated, means for maintaining the same average flux density at either frequency, and means for comparing the areas of the hysteresis loops produced at low and high frequency for the purpose of estimating the relative amount of eddy current loss in the total magnetic loss of the sample at commercial frequency.

9. A method of separating hysteresis and eddy current losses in magnetic testing of ferromagnetic samples, which method comprises the steps of successively applying to a magnetic sample alternating magnetomotive forces of two different frequencies, one of said frequencies being of such a low value that the eddy current loss is negligible, and the other being a commercial frequency at which electrical apparatus employing the material of the sample is to be operated, causing hysteresis loops to be produced, maintaining the same average flux density in the sample at either magnetomotive force frequency, and comparing the areas of the hysteresis loops produced at the said low and higher frequencies for the purpose of estimating the relative amount of eddy current loss in the total magnetic loss of the sample at commercial frequency.

10. A method of comparing iron losses of magnetic samples comprising sheet material assembled flatwise with surfaces adjacent and having adhesions between adjacent surfaces, which method comprises the steps of applying an alternating magnetizing force to the samples of sufficiently low frequency to make the eddy current loss accentuated by the adhesions relatively low in comparison with the hysteresis loss, causing a hysteresis loop to be produced with the ordinates respectively proportional to the magnetic flux in the sample and the magnetizing force, and comparing the thicknesses of the hysteresis loops measured along the axis of the magnetizing force produced by the samples to be compared when a predetermined uniform peak flux density is produced in the said samples.

11. In a magnetic core tester for endless- or closed-magnetic-circuit cores, an openable electrical winding for interlinking with such a core, said openable winding comprising a center post with a plurality of longitudinally extending conductors therein insulated from each other, a plurality of hinged contact fingers radially mounted around said center post each adapted to make electrical contact with one end of one of said center post conductors and a plurality of turn-closing conductors each electrically connected between one of said contact fingers and the opposite end of one of said center post conductors other than the center post conductor adapted to make electrical contact with the same contact finger, one of said turn-closing conductors being interrupted and having a pair of terminals interposed therein for connection to an electrical device to be brought into electromagnetic relation with a magnetic core, said hinged fingers having two alternative positions, in one of which contact is made with the said first ends of said center post conductors and in the other of which clearance is provided surrounding the center post for admitting or withdrawing a magnetic core to be tested.

STEPHEN C. LEONARD.